(12) United States Patent
Nanno et al.

(10) Patent No.: US 7,510,196 B2
(45) Date of Patent: Mar. 31, 2009

(54) OIL RING FOR INTERNAL COMBUSTION ENGINE

(75) Inventors: Keishi Nanno, Aichi (JP); Kazuhito Seki, Saitama (JP); Shiro Shibata, Saitama (JP)

(73) Assignees: Nippon Piston Ring Co., Ltd., Saitama (JP); Toyota Jidosha Kabushiki Kaisha, Aichi (JP)

( * ) Notice: Subject to any disclaimer, the term of this patent is extended or adjusted under 35 U.S.C. 154(b) by 134 days.

(21) Appl. No.: 11/631,575

(22) PCT Filed: Jul. 5, 2005

(86) PCT No.: PCT/JP2005/012390

§ 371 (c)(1),
(2), (4) Date: May 7, 2007

(87) PCT Pub. No.: WO2006/006446

PCT Pub. Date: Jan. 19, 2006

(65) Prior Publication Data

US 2008/0169612 A1   Jul. 17, 2008

(30) Foreign Application Priority Data

Jul. 8, 2004   (JP)   ............... 2004-202204

(51) Int. Cl.
 B60T 11/236   (2006.01)
 F02F 5/00   (2006.01)
 F16J 9/12   (2006.01)
(52) U.S. Cl. ...................... 277/465; 277/434
(58) Field of Classification Search ........... 277/434, 277/435, 447, 465
See application file for complete search history.

(56) References Cited

U.S. PATENT DOCUMENTS 1,581,246 A   4/1926   Teetor
4,796,898 A   1/1989   Brauers et al.

FOREIGN PATENT DOCUMENTS

JP   63-277844   11/1988
JP   2001-032934   6/2001

*Primary Examiner*—Jared J Fureman
*Assistant Examiner*—Ashley Watkins-Butler
(74) *Attorney, Agent, or Firm*—Ladas & Parry LLP

(57) ABSTRACT

An oil ring for an internal combustion engine capable of securing an area of an oil-passing hole without deteriorating the strength of the oil ring. To achieve this the oil ring is provided with an oil-passing hole including: two arc portions disposed at both ends in circumferential direction, so as to be opposed to each other; two parallel straight portions disposed so that a widthwise direction distance therebetween is longer than a width of the arc portion; and inclined portions for connecting the arc portions and the parallel straight portions to each other.

8 Claims, 5 Drawing Sheets

OIL RING FOR INTERNAL COMBUSTION ENGINE

TECHNICAL FIELD

The present invention relates to an oil ring for an internal combustion engine capable of securing an area of an oil-passing hole without deteriorating strength of the oil ring.

BACKGROUND ART

In a conventional internal combustion engine, it is important to reduce friction between an inner surface of a cylinder bore and a piston ring to enhance fuel economy. Especially in the piston ring of the internal combustion engine, it is required to enhance qualities of a pressure ring and an oil ring to reduce a frictional force, and it is also required to reduce oil consumption, as well as the frictional force.

The oil ring has a function which allows lubricating oil to infiltrate into a cylinder bore inner surface to form an appropriate oil film, and to scrape excessive oil on the cylinder bore inner surface, and an oil-control function which controls consumption of the lubricating oil. To enhance these functions of the oil ring, a technique for reducing the axial direction width of the oil ring has been developed.

As shown in FIG. 1B, an oil ring body 1 has two rails 10 and 11 which are connected to each other through a columnar web 15. The oil ring body 1 has a substantially I-shaped cross section. Oil scraped from an inner wall of a cylinder by a sliding surface 12 passes through many oil-passing holes 2 formed in the web 15 and moves toward an inner periphery of the oil ring.

In the oil ring having such a structure, in order to reduce the lubricating oil consumption, the axial direction width of the oil ring, i.e., the height of h1 shown in FIG. 1A is reduced, thereby enhancing the oil control function of the oil ring. However, if the oil ring body is reduced in width, since an area of the oil-passing hole can not be maintained broadly enough, the scraped oil can not swiftly be discharged into the oil ring, and it is difficult to secure the area of the oil-passing hole which is required for smoothly returning the oil into an oil pan. If the area of the oil-passing hole is increased, a thin oil ring has a large opening, and there is a problem that an abutment portion is bent and broken when the oil ring is assembled.

In Patent Document 1, for example, to enhance the strength of the oil ring, a technique for forming a shape of the oil-passing hole into an elliptic shape or a diamond shape is disclosed. According to this technique, by forming the oil-passing hole into the elliptic shape or diamond shape, variation in second moment of area around a periphery of an edge of the oil-passing hole can be moderated, and swelling generated when the oil ring is bent can be reduced.

However, in order to secure the area of the oil-passing hole, it is preferable that the shape of the oil-passing hole in its longitudinal direction is close to a straight line which is in parallel to a radial direction of the oil ring, and the oil-passing hole having the elliptic shape or diamond shape is not preferable for securing the oil passing area.

Patent Document 2 proposes a three piece-type combination oil ring including upper and lower side rails and a spacer expander. In order to prevent a stress concentration at both circumferential direction ends of the oil-passing hole, in the spacer expander portion, the oil ring of the combination oil ring has a long oil-passing hole whose both ends are formed into arc shape. With this shape, it is possible to secure a wide area of the oil-passing hole. Such an oil ring is applicable for the three piece-type expander, but when this is applied to an oil ring in which the upper and lower rails are integrally formed, since the arc portions become large, a cross sectional area of the supporting ring main body becomes small, and there is a problem that a breaking resistance is insufficient.

Patent Document 1: Japanese Patent Application Laid-Open No. 63-277844

Patent Document 2: Japanese Patent Application Laid-Open No. 2001-32934

DISCLOSURE OF THE INVENTION

Problem to be Solved by the Invention

The present invention has been accomplished in view of the above problems, and it is a main object of the present invention to provide an oil ring capable of securing an area of an oil-passing hole without deteriorating strength of the oil ring.

Means for Solving the Problem

To achieve the above object, the present invention provides an oil ring for an internal combustion engine comprising upper and lower rails (10, 11) for scraping oil, and a web (15) connecting the upper and lower rails (10, 11) to each other, wherein the web is provided with an oil-passing hole (2) which is formed long in a circumferential direction of the oil ring, the oil-passing hole includes: two arc portions (3) disposed at both ends, so as to be opposed to each other; two parallel straight portions (4) disposed so that a widthwise direction distance therebetween is longer than a width (X) of the arc portion; and inclined portions (5) for connecting the arc portions and the parallel straight portions to each other, and when height of a main body of the oil ring for the internal combustion engine is defined as (h1), distance between the two parallel straight portions of the oil-passing hole is defined as (h2), a radius of curvature of the arc portion is defined as (R) and a central angle of the arc portion is defined as ($\theta$), R/h1=0.05 to 0.20, $\theta$=90 to 160°, 2R<h2, and h2/h1=0.15 to 0.6.

In the present invention, since the oil-passing hole has the above-described shape, the area of the oil-passing hole can be secured without deteriorating the strength of the oil ring.

In the above-described invention, it is preferable that, when a circumferential direction length of the oil-passing hole is defined as "a" and length of the parallel straight portion is defined as "b", b/a=0.2 to 0.9. If the b/a is in this range, a greater area of the oil-passing hole can be secured without deteriorating the strength of the oil ring.

In the above-described invention, it is preferable that, in the inclined portion (5) which connects the arc portion (3) and the parallel straight portion (4) with each other, when a point at which the arc portion (3) and the inclined portion (5) intersect with each other is defined as a point P, a point at which the inclined portion (5) and the parallel straight portion (4) intersect with each other is defined as a point Q, a section between the point P and the point Q is defined as a section S, stress generated in the section S of the inclined portion when a load W is applied from an upper portion of an arc portion (33), which is opposed to the arc portion (3) adjacent to the inclined portion (5), is substantially even. The expression that the stress generated in the section S is substantially even means that a maximum value and a minimum value of stress are within ±0.3% with respect to the average value. The average value of stress in the section S is an average value of at least five points, i.e., the point P which is a boundary point of the section S, the point Q which is another boundary point, a substantially center point between the points P and Q, a point between the point P and the substantially center point, and a point between the point Q and the substantially center point. Here, the substantially center point means a point located in a range of 1/10 length of a distance between the points P and Q, with respect to the center point between the points P and Q. Since the oil-passing hole has the above-described shape, even when the oil-passing hole is located at the abutment portion of the oil ring, a greater area of the oil-passing hole can be secured without deteriorating the strength of the oil ring.

In the above-described invention, it is preferable that the height h1 of the main body of the oil ring is 2.5 mm or less. The above-described problem of the area of the oil-passing hole and the strength of the oil ring is more serious in a thinned oil ring, and if the height of the oil ring body is set in the above range, the effect of the present invention is more clearly exhibited.

Effect of the Invention

According to the oil ring of the present invention, it is possible to secure an area of an oil-passing hole without deteriorating strength of the oil ring.

BRIEF DESCRIPTION OF THE DRAWINGS

FIG. 1 is a diagram showing one example of a structure of an oil ring of the present invention, wherein

REFERENCE NUMERALS

Figure 1A:
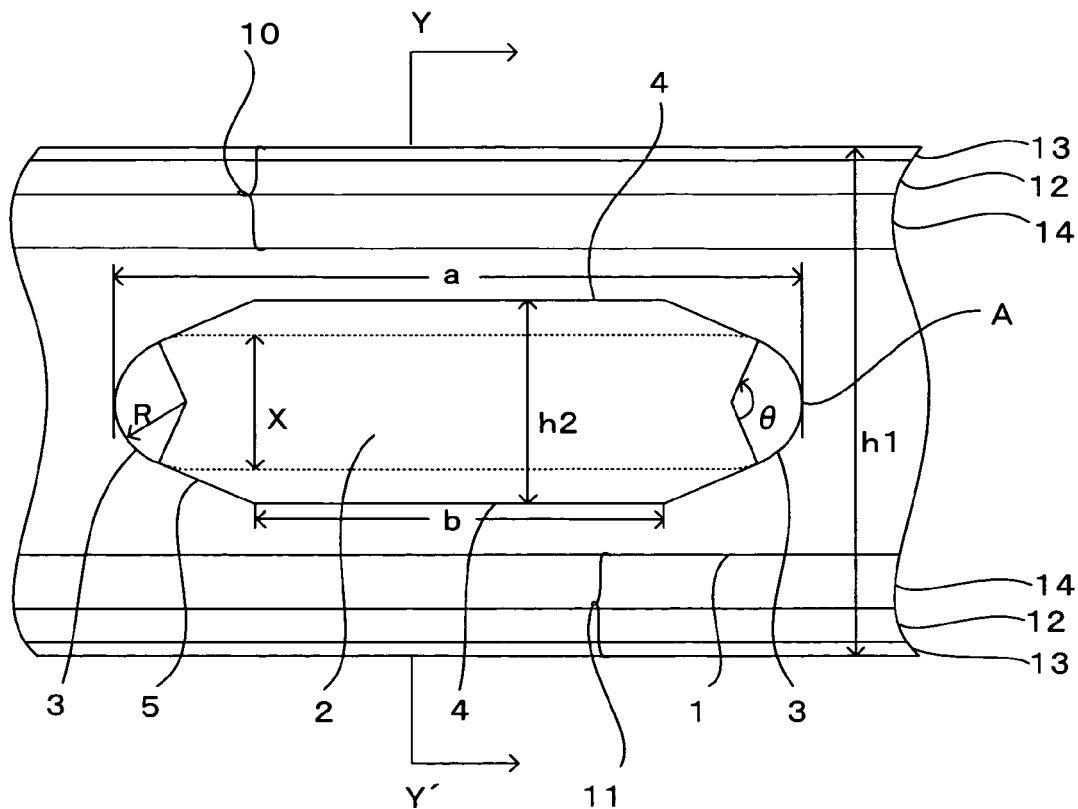
FIG. 1A is a partial development of an oil aperture portion as viewed from an outer peripheral side surface side.

1 . . . oil ring body
2 . . . oil-passing hole
3 . . . arc portion
4 . . . parallel straight portion
5 . . . inclined portion
10 . . . upper rail
11 . . . lower rail
12 . . . sliding surface
13 . . . outer peripheral side chamfered portion
14 . . . inner peripheral side surface
15 . . . web
23 . . . expander

BEST MODE FOR CARRYING OUT THE INVENTION

An oil ring for an internal combustion engine of the present invention will be explained concretely using the drawings below.

Figure 1B:
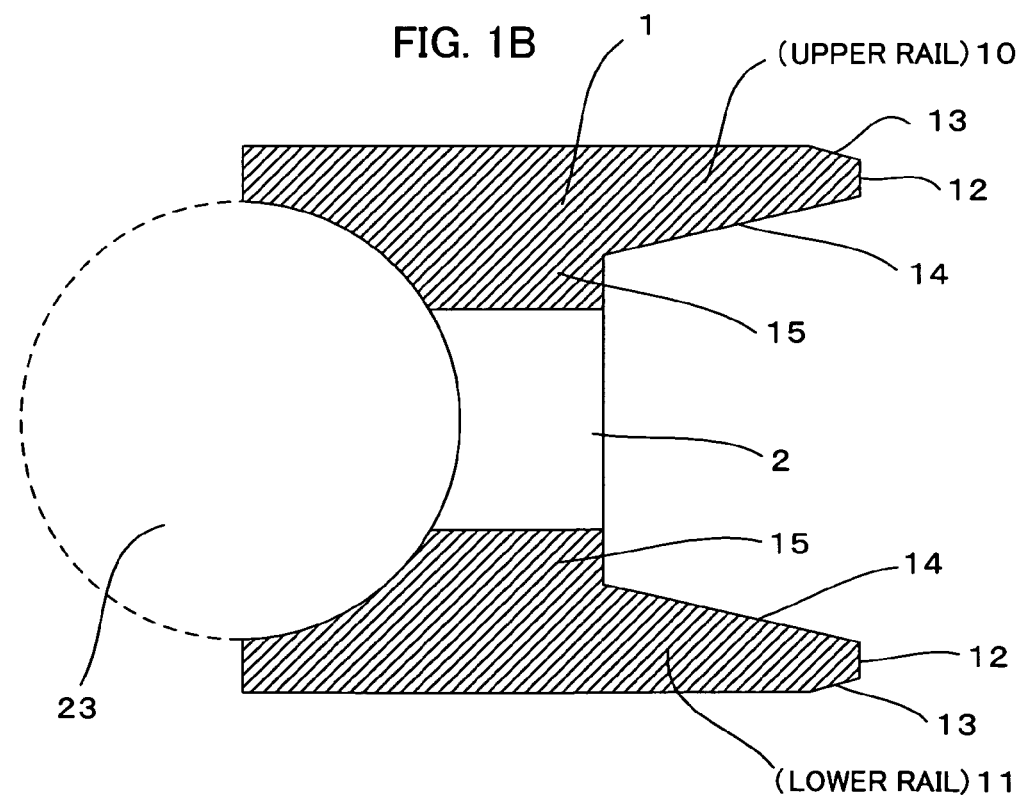
FIG. 1B is a sectional view taken along the line Y-Y' in FIG. 1A.

FIG. 1A and FIG. 1B show one example of a structure of the oil ring of the present invention, wherein FIG. 1A is a partial development of an oil aperture portion as viewed from an outer peripheral side surface, and FIG. 1B is a sectional view taken along the line Y-Y' in FIG. 1A. The oil ring of the present invention includes an oil ring body 1 and an expander 23. As shown in FIG. 1B, the oil ring body 1 includes two rails (upper and lower rails) 10 and 11, and a web 15 connecting these rails 10 and 11 with each other. The web 15 is provided with an oil-passing hole 2. The upper and lower rails 10 and 11 are composed of sliding surfaces 12, outer peripheral side chamfered portions 13 and inner peripheral side surfaces 14. As detailed shape shown in FIG. 1A, two arc portions 3 disposed at both ends of the oil-passing hole 2 so as to be opposed to each other, and two parallel straight portions 4 disposed so that the widthwise direction distance therebetween is longer than the width X of the arc portion 3 are connected to each other via inclined portions 5. The shape shown with a broken line in FIG. 1 is a shape of a conventional long oil-passing hole whose both ends are formed in arc-like shape. The width X of the arc portion in the present invention is a distance between both ends of the arc portion, along the axial direction height of the oil ring.

In the present invention, in the oil-passing hole having the above-described shape, a distance between the two parallel straight portions 4 of the oil-passing hole 2 is defined as "h2", a circumferential direction length of the oil-passing hole 2 is defined as "a", and a length of the parallel straight portion 4 is defined as "b". A radius of curvature of the arc portion 3 is defined as "R", and a central angle thereof is defined as "θ".

When the oil ring is assembled into a piston, the oil ring is prone to be bent and broken at an end (portion shown with "A" in FIG. 1) of the oil-passing hole where stress concentrates. Therefore, in this invention, the both ends of the oil-passing hole are formed into the conventional arc shapes having high breaking resistance, and a widthwise direction distance of a portion other than the both ends, where stress is less prone to concentrate, is increased. That is, the parallel straight portion is disposed such that the distance h2 between the two parallel straight portions becomes longer than a width of the arc portion. With this, it is possible to increase the area of the oil-passing hole while maintaining the conventional breaking resistance.

As the above-described shape of the oil-passing hole for securing a wide area without deteriorating the strength of the oil ring, it is preferable that R/h1 which is a ratio of a radius of curvature R of the arc portion to a height h1 of the oil ring body is in a range of 0.05 to 0.20, more preferably in a range of 0.06 to 0.18 and particularly preferably in a range of 0.09 to 0.15. If R/h1 is lower than the above range, since the arc portions of the both ends are small, there is a possibility that the area of the oil-passing hole can not sufficiently be secured. If R/h1 exceeds the above range, the openings of the both ends of the oil-passing hole are excessively large, and there is a possibility that the strength of the oil ring is deteriorated.

In the present invention, it is preferable that the central angle θ of the arc portion is in a range of 90° to 160°, more preferably in a range of 100° to 155°, and particularly preferably in a range of 115° to 150°. If θ is lower than the above range, there is a possibility that stress concentrates on the arc portion, and the breaking resistance is deteriorated. If θ exceeds the above range, since the shape of the oil-passing hole is similar to the conventional oil-passing hole whose θ is 180°, there is a possibility that the area of the oil-passing hole can not sufficiently be secured.

In the present invention, it is preferable that h2/h1 is in a range of 0.15 to 0.6, more preferably in a range of 0.20 to 0.5 and particularly preferably in a range of 0.22 to 0.4. If h2/h1 is lower than the above range, there is a possibility that the area of the oil-passing hole can not sufficiently be secured. If h2/h1 exceeds the above range, the opening of the oil-passing hole is excessively large, and there is a possibility that the strength of the oil ring can not be maintained.

In the present invention, in addition to the above facts, it is preferable that b/a is in a range of 0.2 to 0.9, more preferably in a range of 0.25 to 0.8 and particularly preferably in a range of 0.35 to 0.6. If b/a is lower than the above range, there is a possibility that the area of the oil-passing hole can not sufficiently be secured. If b/a exceeds the above range, the openings of the oil-passing hole at both ends are excessively large, and there is a possibility that the strength of the oil ring is deteriorated.

The present invention is characterized in that stress generated in the section S of the inclined portion (5) is substantially even. Here, substantially even means that a maximum value and a minimum value are within ±0.3% with respect to the average value of stress generated in the section S of the inclined portion. Especially, it is preferable that the maximum value and minimum value are within ±0.2% with respect to the average value. If a difference between the average value and the maximum value or minimum value of the stress is 0.3% or more, the stress tends to concentrate at the point where the maximum stress in the section S is applied, and there is a possibility that the strength of the oil ring is deteriorated.

Figure 5:
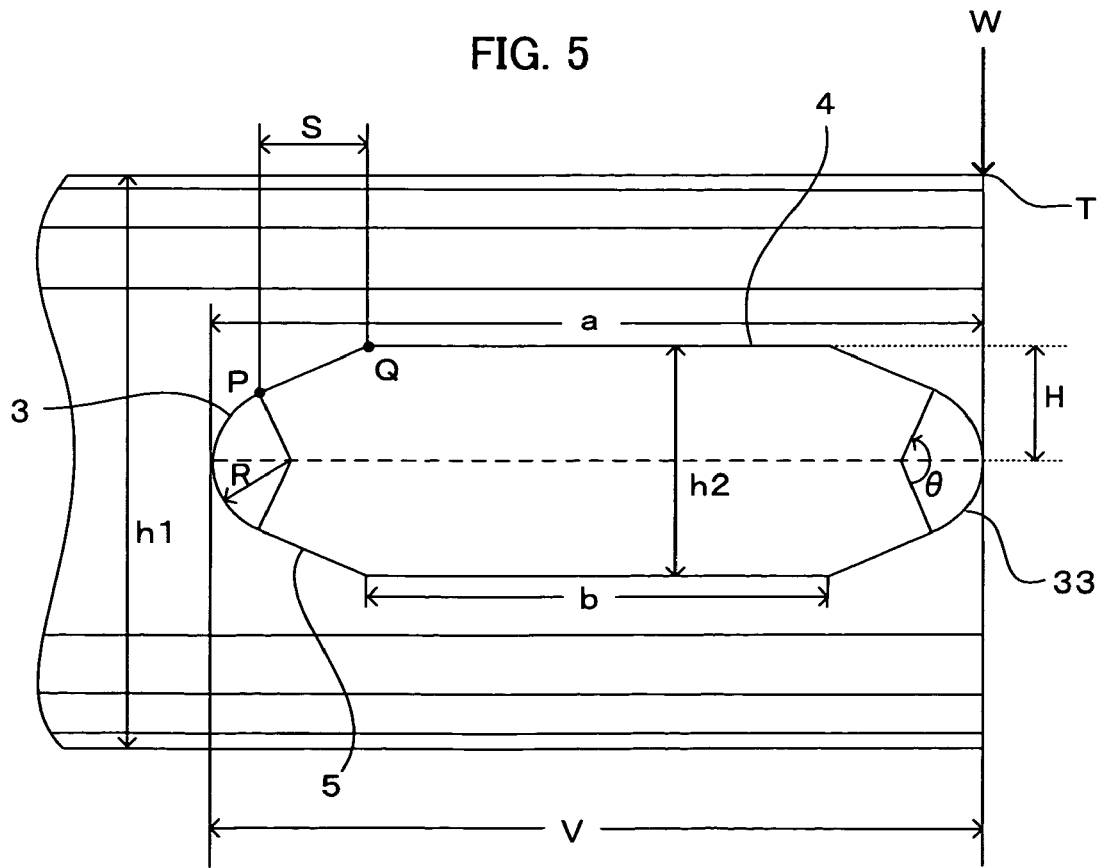
FIG. 5 is a diagram showing one example when a load W is applied to an oil ring of the present invention.

FIG. 5 shows details. As shown in FIG. 5, a point at which the arc portion (3) and the inclined portion (5), which connects the arc portion (3) and the parallel straight portion (4) with each other, intersect is defined as a point P, a point at which the inclined portion (5) and the parallel straight portion (4) intersect with each other is defined as a point Q, and a section between the point P and the point Q is defined as the section S. In the present invention, when a load W is applied from an upper portion of the arc portion (33), which is opposed to the arc portion (3) adjacent to the inclined portion (5), the stress generated in the section S of the inclined portion is substantially even. Thereby, the stress generated in the section S, when a load W is applied to the arc portion (33), can be set equivalent to or lower than the maximum stress generated in the conventional shape shown in FIG. 6.

In the present invention, it is preferable that the height h1 of the oil ring body is 2.5 mm or less, more preferably in a range of 1.0 to 2.5 mm, and particularly preferably in a range of 1.2 to 2.0 mm. This is because, in the case of the thinned oil ring, the oil ring body is not so large in heights so that it is difficult to sufficiently secure the area of the oil-passing hole without deteriorating strength of the oil ring in many cases, and the effect of the present invention is exhibited more remarkably.

The radius of curvature R of the arc portion is preferably in a range of 0.05 to 0.35, and more preferably in a range of 0.1 to 0.3. In this case, it is preferable that R is appropriately adjusted in accordance with size of h1. In addition to the value of R/h1 in the above-described range, for example when h1 is 1.2 mm, R is preferably in a range of 0.10 to 0.20 and more preferably in a range of 0.12 to 0.18, and when h1 is 1.5 mm, R is preferably in a range of 0.15 to 0.25 and more preferably in a range of 0.17 to 0.23, and when h1 is 2.0 mm, R is preferably in a range of 0.15 to 0.25 and more preferably in a range of 0.17 to 0.23.

Further in the above-described oil ring of the present invention, it is preferable that "a" is in a range of 1.0 to 2.0 mm, more preferably in a range of 1.2 to 1.6 mm, "b" is in a range of 0.4 to 0.9 mm and more preferably in a range of 0.5 to 0.7 mm, and h2 is 2R<h2, and h2/h1 is in a range of 0.15 to 0.6. More specifically, it is preferable that:

when h1 is 1.2 mm, h2 is in a range of 0.18 to 0.72;

when h1 is 1.5 mm, h2 is in a range of 0.22 to 0.9; and when h1 is 2.0 mm, h2 is in a range of 0.3 to 1.2.

Even if the respective values are in the above-described range of R/h1, h2/h1, b/a, if the individual value is out of the range, there is a possibility that: the opening becomes excessively wide so that the strength of the oil ring is deteriorated; or on the contrary, the area of the oil-passing hole can not sufficiently be secured.

The oil ring used in the present invention is not especially limited as long as the oil ring can be provided with the oil-passing hole. Commonly used oil rings such as a single-piece oil ring, a two-piece oil ring and a three-piece oil ring can be used. Especially the two-piece oil ring is preferably used.

In the present invention, the parallel straight portion and the inclined portion need not have strict straight lines, and may have shapes close to the straight lines. The arc portion and the parallel straight portion are connected to each other through the inclined portion provided on a tangential line at an end of the arc portion. At that time, it is preferable that a connection portion between the inclined portion and the parallel straight portion is rounded to prevent the stress from concentrating.

The present invention is not limited to the above-described embodiments. The above-described embodiments are merely examples, and any one having the substantially same configuration and the same effects, or equivalent thereof, as the technological idea disclosed in the claims of the present invention is included in the technological scope of the present invention.

EXAMPLES

The present invention will be explained in more detail with reference to Examples and Comparative Examples.

Example 1

Comparative Example 1

Concerning an oil ring used in Example 1, height h1 of the main body of the oil ring was 2.0 mm, an axial direction width of the sliding surface 12 was 0.2 mm. The oil ring was obtained by subjecting steel material to gas-nitriding process to form a nitride layer of 50 μm and the layer was finished. The steel material included C: 0.70, Si: 0.25, Mn: 0.30, Cr: 8.0, P: 0.02, S: 0.01 and Fe: the rest (mass %)

Referring to FIG. 1A, the central angle θ of the arc portion was set to 100°, "a" was set to 1.4 mm, the radius of curvature R of the arc portion and the distance h2 between the two parallel straight portions were varied, and a breaking load was measured according to the following method. In Comparative Example 1-1, an oil ring having conventional shape oil-passing holes, in which the central angle θ of the arc portion is 180°, was used. Values of R and h2, values of b/a, and results of breaking load evaluation are shown in Table 1.

Example 2

Comparative Example 2

The breaking load was measured in the same manner as that of Example 1 except that the height h1 of the oil ring body was set to 1.5 mm. In Comparative Example 2-1, an oil ring having conventional shape oil-passing holes, in which the central angle θ of the arc portion is 180°, was used. Values of R and h2, and results of breaking load evaluation are shown in Table 1.

Example 3

Comparative Example 3

The breaking load was measured in the same manner as that of Example 1 except that the height h1 of the oil ring body was set to 1.2 mm. In Comparative Example 3-1, an oil ring having conventional shape oil-passing holes, in which the central angle θ of the arc portion is 180°, was used. Values of R and h2, and results of breaking load evaluation are shown in Table 1.

(Breaking Load Measuring Method)

Figure 2:
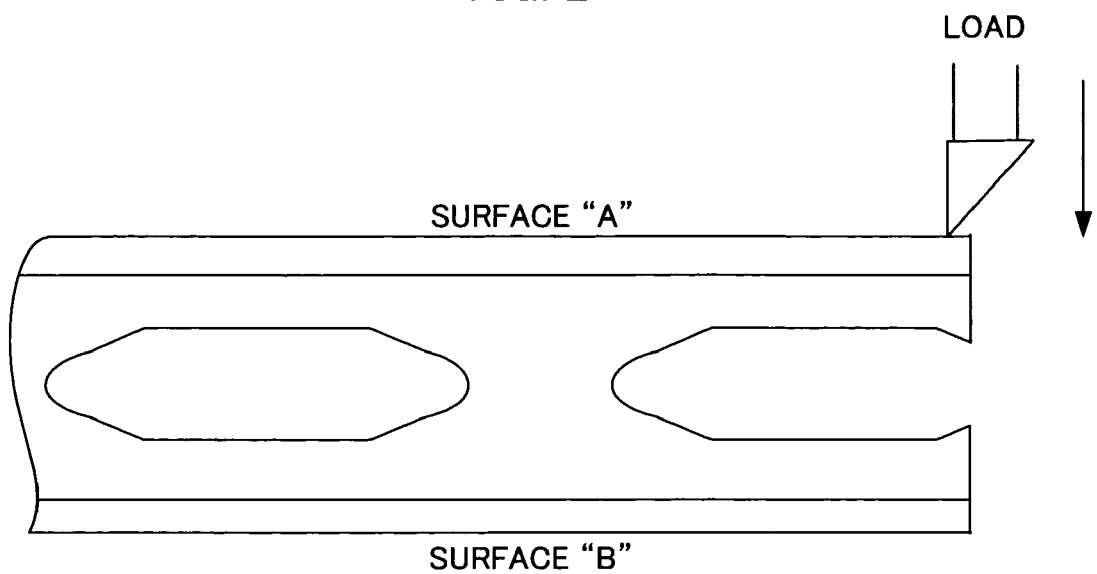
FIG. 2 is a schematic sectional view explaining a method of a breaking load test in Examples and Comparative Examples.

The oil-passing hole portion of the oil ring having the oil-passing hole was cut such that a cantilever length became maximum, a load was applied by a bend tester, and the breaking load was measured. At that time, to offset the deviation of the oil-passing hole, the breaking loads were measured both when the load was applied from the A-surface of the oil ring and when the load was applied from the B-surface of the oil ring in FIG. 2, and an average value thereof was obtained.

(Evaluation)

The breaking load was evaluated in such a manner that Comparative Examples 1-1, 2-1 and 3-1, having conventional shapes, were defined as references of respective Examples, and the breaking load was set to 1. When the degradation of the breaking load was up to 10%, the case was evaluated as ○. When the degradation of the breaking load was within 10% to 30%, the case was evaluated as Δ. And when the degradation of the breaking load was 30% or more, the case was evaluated as X.

TABLE 1

| | R (mm) | R/h1 | h2 (mm) | h2/h1 | b/a | Breaking load evaluation |
|---|---|---|---|---|---|---|
| Comparative Example 1-1 | 0.20 | 0.10 | 0.40 | 0.20 | 1.0 | ○ |
| Example 1-1 | 0.20 | 0.10 | 0.55 | 0.28 | 0.69 | ○ |
| Example 1-2 | 0.20 | 0.10 | 1.0 | 0.50 | 0.32 | ○ |
| Example 1-3 | 0.40 | 0.20 | 0.9 | 0.45 | 0.40 | ○ |
| Comparative Example 1-2 | 0.20 | 0.10 | 1.3 | 0.65 | 0.07 | Δ |
| Comparative Example 1-3 | 0.50 | 0.25 | 1.1 | 0.55 | 0.24 | X |
| Comparative Example 2-1 | 0.20 | 0.13 | 0.40 | 0.27 | 1.0 | ○ |
| Example 2-1 | 0.20 | 0.13 | 0.60 | 0.40 | 0.66 | ○ |
| Example 2-2 | 0.30 | 0.20 | 0.80 | 0.53 | 0.57 | ○ |
| Comparative Example 2-2 | 0.20 | 0.13 | 1.00 | 0.67 | 0.32 | Δ |
| Comparative Example 2-3 | 0.40 | 0.27 | 0.85 | 0.57 | 0.80 | X |
| Comparative Example 3-1 | 0.20 | 0.17 | 0.40 | 0.33 | 1.0 | ○ |
| Example 3-1 | 0.07 | 0.058 | 0.25 | 0.21 | 0.84 | ○ |
| Example 3-2 | 0.10 | 0.083 | 0.25 | 0.21 | 0.86 | ○ |
| Example 3-3 | 0.20 | 0.17 | 0.60 | 0.50 | 0.66 | ○ |
| Example 3-4 | 0.24 | 0.20 | 0.56 | 0.47 | 0.71 | ○ |
| Comparative Example 3-2 | 0.05 | 0.042 | 0.22 | 0.18 | 0.86 | X |
| Comparative Example 3-3 | 0.20 | 0.17 | 0.80 | 0.67 | 0.49 | Δ |
| Comparative Example 3-4 | 0.26 | 0.22 | 0.60 | 0.50 | 0.70 | X |

As apparent from the results in Table 1, when R/h1=0.05 to 0.20, h2/h1=0.15 to 0.6 and b/a=0.2 to 0.9, the degradation in breaking load was suppressed to 10% or less as compared with the oil rings having conventional shaped oil-passing hole, and the oil ring had substantially the same strength. On the other hand, when the above values are out of the above range, the breaking load was degraded by 30% or more, and the oil ring did not have sufficient strength.

Example 4

Concerning an oil ring used in this Example, the same steel material as that of Example 1 was used, it was subjected to the same surface treatment. The height h1 of the oil ring body was set to 2.0 mm, the axial direction width of the sliding surface 12 was set to 0.2 mm. For the oil-passing hole, the radius of curvature R of the arc portion was set to 0.2 mm, the distance h2 between the two parallel straight portions was set to 0.55 mm, and θ was set to 145°. The breaking load was measured in the same manner as that of Example 1 (Example 4-1). The breaking load was measured in the same manner except that θ was set to 90° (Example 4-2).

Comparative Example 4

The breaking load was measured in the same manner as that of Example 4 except that θ of the oil-passing hole was set to 80° (Comparative Example 4-1) and 60° (Comparative Example 4-2).

(Evaluation)

Figure 3:
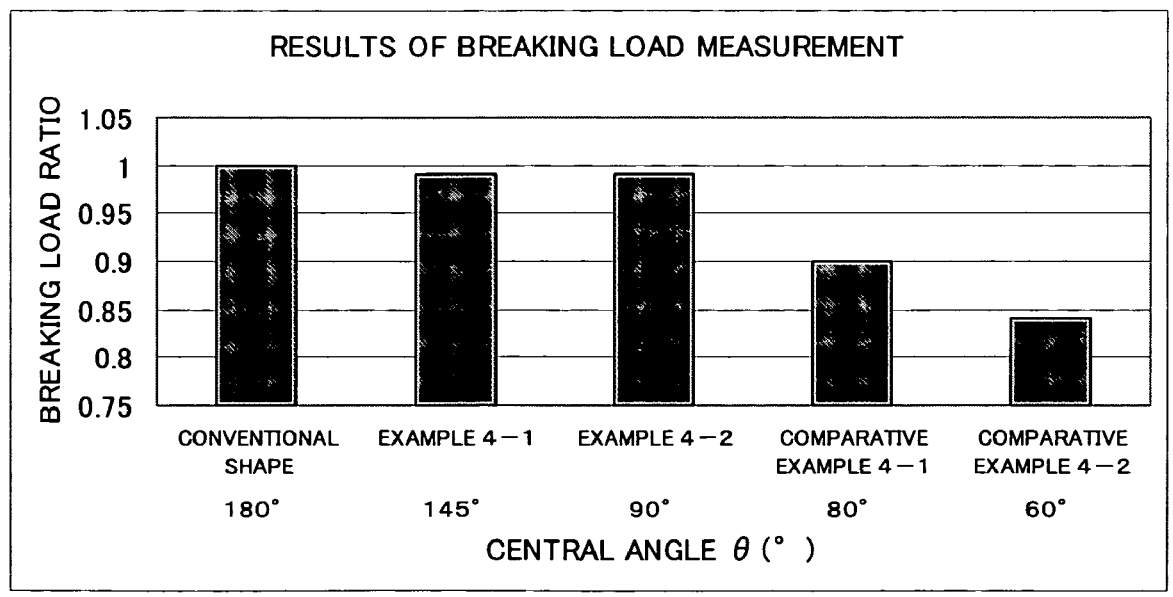
FIG. 3 is a graph showing a result of a breaking load measurement in Example 4 and Comparative Example 4.

FIG. 3 is a graph showing a result of measurement of Example 4 and Comparative Example 4 when the breaking load of the conventional oil ring having θ of 180° was set to 1. Concerning the conventional product, Example 4-1 and Example 4-2, as apparent from FIG. 3, practically no difference in breaking load, caused by the difference in shape of the oil-passing hole, was observed. On the other hand, in Comparative Example 4-1 and Comparative Example 4-2, degradation in breaking load was observed. From this, it is obvious that the oil ring of the present invention, in which θ is in the above range, has larger oil-passing hole area than the oil ring having the oil-passing hole of the conventional shape, but degradation in strength of the oil ring due to enlargement of the area was not observed. Also, it is obvious that, if θ is less than the above range, the strength of the oil ring is deteriorated.

Example 5

An oil consumption test of the oil ring of the present invention was carried out, in a high speed mode, using a four-cylinder engine (bore diameter was 95 mm) having displacement of 2,700 cc. At that time, the test was carried out using four kinds of oil rings in which central angles θ of the arc portions of the oil-passing holes are 160° (Example 5-1), 145° (Example 5-2), 120° (Example 5-3) and 90° (Example 5-4).

In the oil ring used in this Example, the same steel material as that of the example 1 was used, and it was subjected to the same surface treatment and finished. The height h1 of the oil ring body was set to 2.0 mm, the axial direction width of the sliding surface 12 was set to 0.2 mm. For the oil-passing hole, the radius of curvature R of the arc portion was set to 0.2 mm, and the distance h2 between the two parallel straight portions was set to 0.52 mm (Example 5-1), 0.55 mm (Example 5-2), 0.92 mm (Example 5-3), and 1.10 mm (Example 5-4).

A top ring and a second ring used in this example are as follows:

Top Ring size: h1×a1=1.2×2.7 material: 10CrSUS nitride (material includes C: 0.50, Si: 0.20, Mn: 0.30, Cr: 10.00 and Fe: the rest (mass %), the material was subject to gas-nitriding process, and has a nitride layer of 70 μm).

shape: rectangular, barrel face

Second Ring size: h1×a1=1.2×3.4 material: cast iron shape: taper undercut

Here, h1 represents height of the ring, a1 represents radial direction width of the ring, unit for the height and width is mm.

Comparative Example 5

The oil consumption test was carried out in the same manner as that of Example 5 except that central angle θ of the arc portion was set to 170° and the distance h2 between the two parallel straight portions was set to 0.42 mm (Comparative Example 5-1).

(Evaluation)

Figure 4:
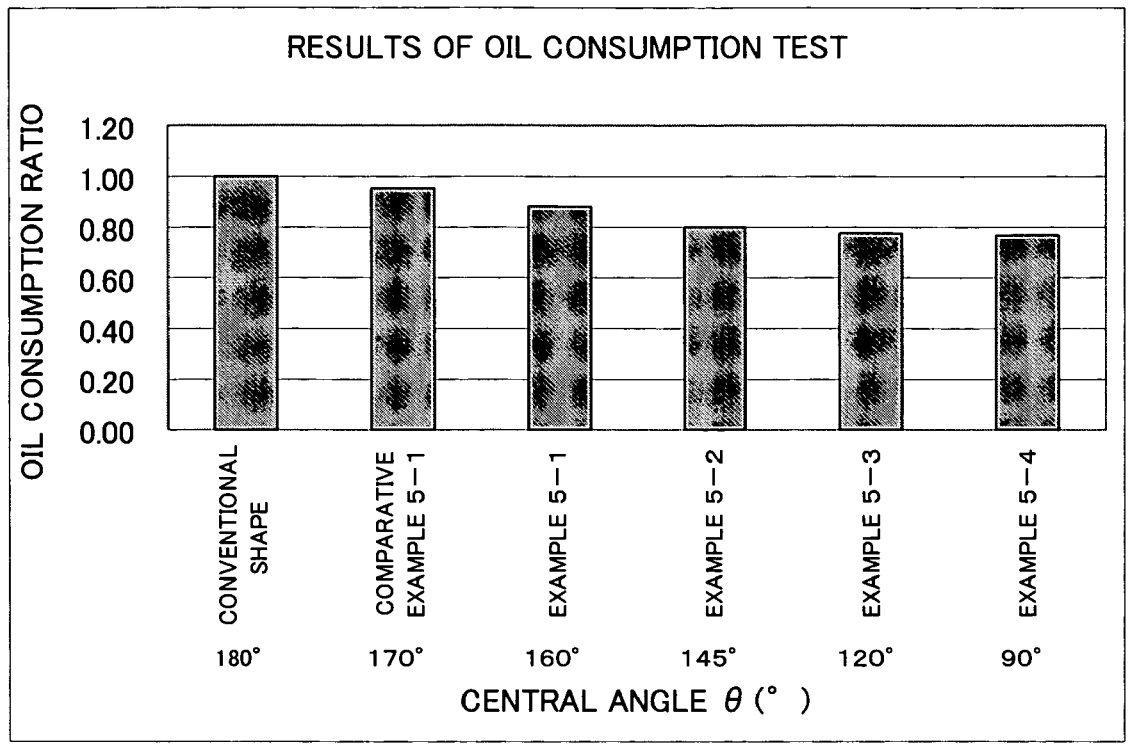
FIG. 4 is a graph showing a result of an oil consumption test in Example 5 and Comparative Example 5.

FIG. 4 is a graph showing a result of measurement of Example 5 and Comparative Example 5 when the oil consumption of the conventional oil ring having θ of 180° was set to 1. As apparent from FIG. 4 that in the Examples 5-1 to 5-4 in which the θ was in the range of 90° to 160°, the oil consumption is largely improved as compared with the conventional products, but the oil consumption of Comparative Example 5-1, having θ of 170°, the improved amount was smaller as compared with the conventional product.

Example 6

In this example, an oil ring having the following dimension was used: height h1 of the oil ring body was 2.0 mm; circumferential direction length "a" of the oil-passing hole was 1.4 mm; length "b" of the parallel straight portion was 0.58 mm; the distance h2 between the two parallel straight portions was 0.55 mm; a radius of curvature R of the arc portion was 0.2 mm; and the central angle θ of the arc portion was 145°. It was assumed that the oil-passing hole was provided at the oil ring abutment portion as shown in FIG. 5, and stress generated in the section S of the inclined portion (5), when a load W was applied to an upper portion T of the abutment portion, was calculated. At that time, circumferential direction length from the abutment portion of the oil-passing hole to a measuring position was defined as V, height from the stress measuring position to the center line in the height direction was defined as H, and the load W to be applied was 100N (constant).

Comparative Example 6

Figure 6:
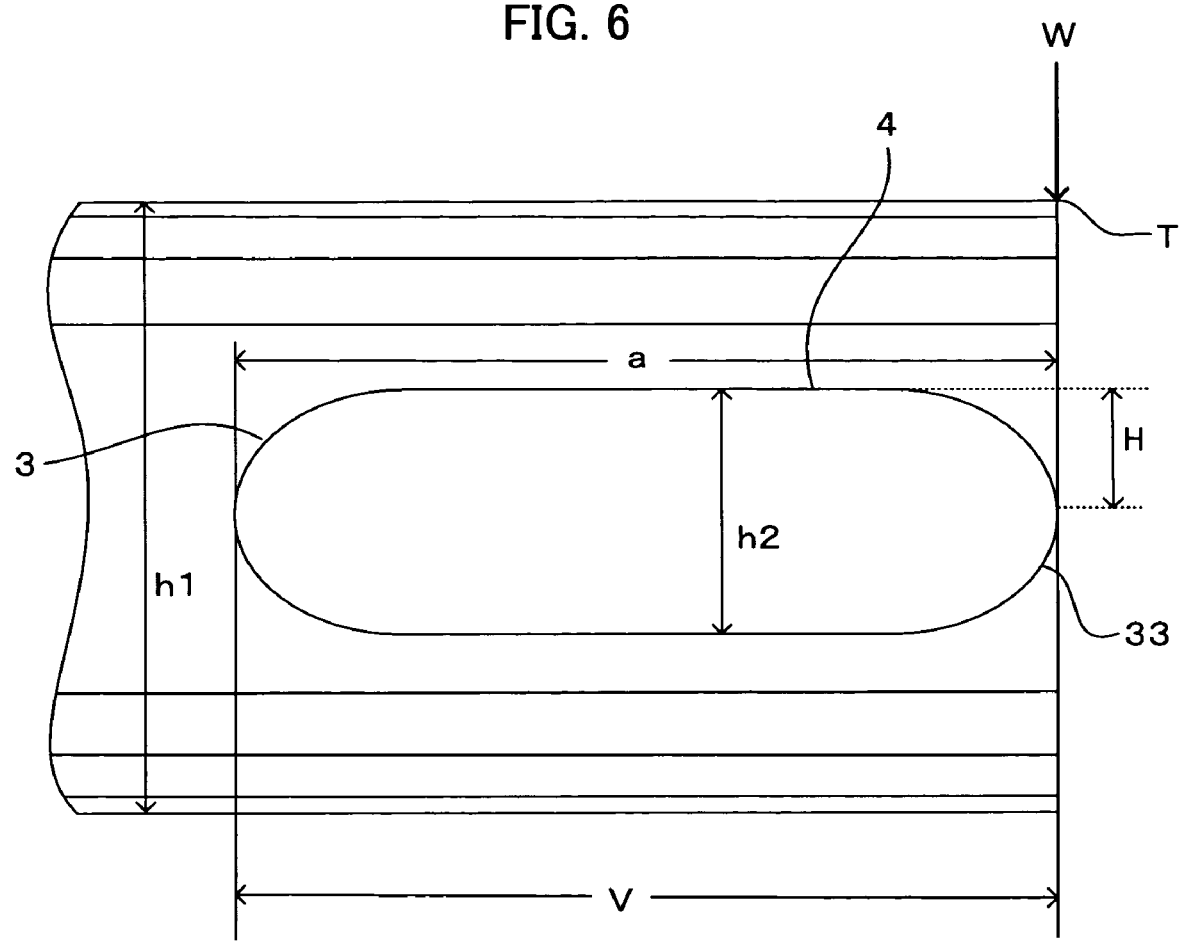
FIG. 6 is a diagram showing one example when the load W is applied to a conventional oil ring.

Stress generated in the section S was calculated in the same manner as that of Example 6 except that, as shown in FIG. 6, the central angle θ of the arc portion of the oil-passing hole of the oil ring was 180°, and the distance h2 between the two parallel straight portions was 0.4 mm.

(Evaluation)

Tables 2 and 3 show results of calculation of Example 6 and Comparative Example 6. Tables 2 and 3 show the results of stress σ, when a load 100 N was applied, calculated from the circumferential direction length V, a cross section coefficient, and a bending moment.

TABLE 2

| Circumferential direction length: V(mm) | Stress σ (MPa) | Height H (mm) |
|---|---|---|
| 1.396 | 733.8 | 0.04 |
| 1.383 | 788.8 | 0.08 |
| 1.36 | 843.8 | 0.12 |
| 1.32 | 894.1 | 0.16 |
| 1.205 | 894.1 | 0.2 |
| 1.148 | 892.8 | 0.22 |
| 1.095 | 893.5 | 0.24 |
| 1.043 | 893.9 | 0.26 |
| 0.992 | 893.9 | 0.275 |
| 0.8 | 652.8 | 0.275 |
| 0.7 | 519.4 | 0.275 |

* Height H is length from a stress measuring position to a center line in height direction

TABLE 3

| Circumferential direction length: V(mm) | Stress σ (MPa) | Height H (mm) |
|---|---|---|
| 1.396 | 733.8 | 0.04 |
| 1.383 | 788.8 | 0.08 |
| 1.36 | 843.8 | 0.12 |
| 1.32 | 894.1 | 0.16 |
| 1.2 | 890.4 | 0.2 |
| 0.8 | 593.6 | 0.2 |
| 0.7 | 519.4 | 0.2 |

Figure 7:
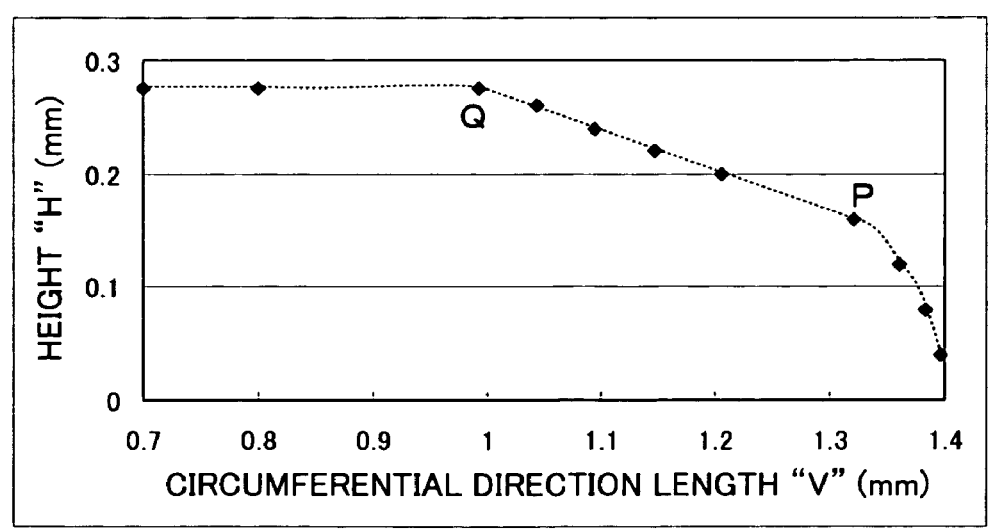
FIG. 7 is a diagram showing a shape of an oil-passing hole of the oil ring and a stress measuring position in Example 6.

* Height H is length from a stress measuring position to a center line in height direction In FIG. 7, the lateral axis shows the circumferential direction length V from the abutment portion of the oil-passing hole to the stress measuring position in Table 2, and the vertical axis shows the height H from the stress measuring position to the center line in the height direction. FIG. 7 shows a relation between V and H. The average value of stress of the inclined portion (5) is an average value of stress at six points from V=0.992 to 1.32 shown in FIG. 7. The maximum stress in Comparative Example 6 was 894.1 MPa. However, in Example 6, in which the shape of the inclined portion (5) connecting the arc portion (3) and the parallel straight portion (4) is shown in FIG. 7, the average stress of the six points of the inclined portion (5) was 893.7 MPa, the maximum value was 894.1 MPa (average value +0.04%), the minimum value was 892.8 MPa (average value −0.10%), difference between the maximum value and the minimum value of stress was within ±0.3%, and this is equivalent to the maximum stress in Comparative Example 6.

Figure 8:
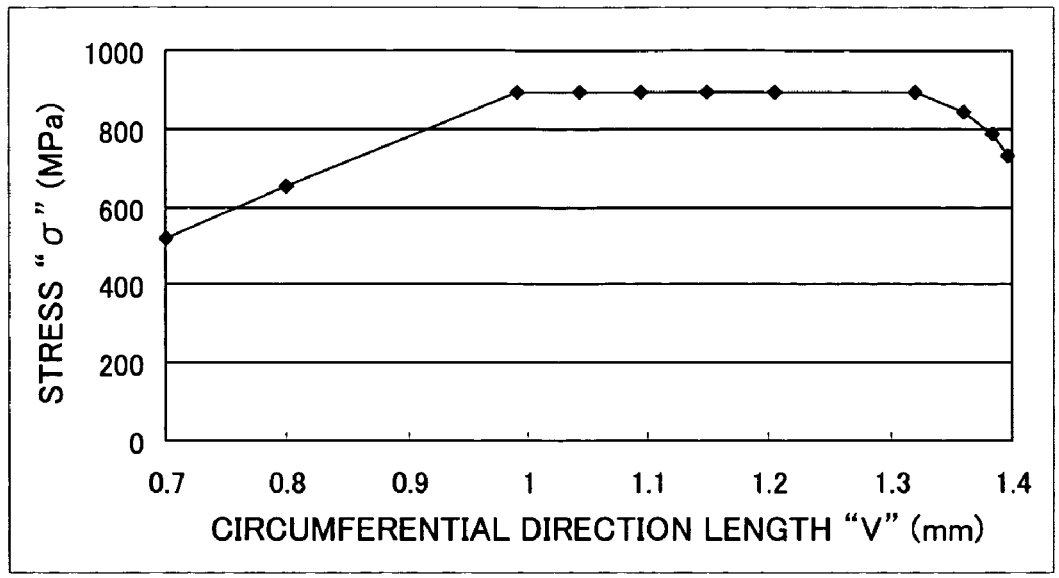
FIG. 8 is a diagram showing a relation between a circumferential direction length V from an abutment portion the oil ring and a stress σ in Example 6.
Figure 9:
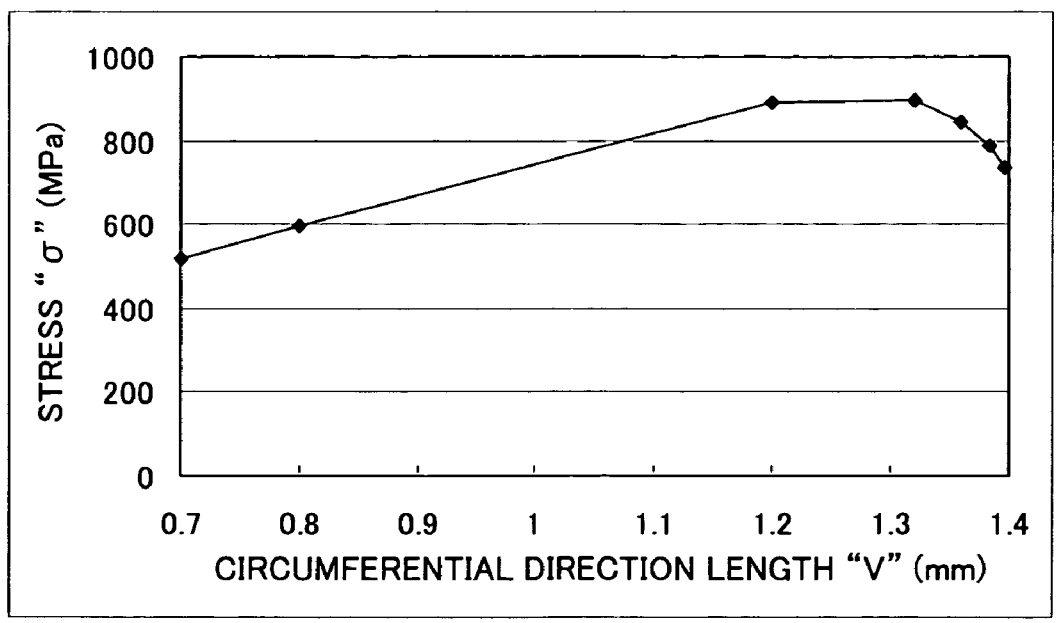
FIG. 9 is a diagram showing a relation between a circumferential direction length V from an abutment portion the oil ring and a stress σ in Comparative Example 6.

In FIG. 8, the lateral axis shows the circumferential direction length V from the abutment portion in Example 6, the vertical axis shows the generated stress σ. FIG. 8 shows a relation of the length V and stress σ from the result of calculation of Table 2. FIG. 9 shows the same relation as that of FIG. 8 in Comparative Example 6. As apparent from FIGS. 8 and 9, it is possible to secure an area of the oil-passing hole as wide as 23% wider than the conventional shape with the same stress or even smaller stress than the maximum stress generated in the oil-passing hole in Comparative Example 6.

From Tables 2 and 3 and FIGS. 7 to 9, it can be said that in the example 6, the area of the oil-passing hole wider than that of the conventional shape can be secured while maintaining the value not higher than the maximum stress in Comparative Example 6. Also, even when the oil-passing hole is provided at the abutment portion, the oil ring can be used without problems since the applied stress can be set equivalent to or lower than the maximum stress applied to the conventional shape shown in FIG. 6.

The invention claimed is:

1. An oil ring for an internal combustion engine comprising upper and lower rails for scraping oil, and a web connecting the upper and lower rails to each other,
   wherein the web is provided with an oil-passing hole which is formed long in a circumferential direction of the oil ring,
   the oil-passing hole includes:
   two arc portions disposed at both ends, so as to be opposed to each other;
   two parallel straight portions disposed so that a widthwise direction distance therebetween is longer than a width of the arc portion; and
   inclined portions for connecting the arc portions and the parallel straight portions to each other, and
   wherein a height of a main body of the oil ring for the internal combustion engine is defined as $h1$, a distance between the two parallel straight portions of the oil-passing hole is defined as $h2$, a radius of curvature of the arc portion is defined as R and a central angle of the arc portion is defined as 0, and $R/h1$=0.05 to 0.20, 0=90 to 160°, $2R<h2$, and $h2/h1$=0.15 to 0.6.

2. The oil ring for an internal combustion engine according to claim 1, wherein a circumferential direction length of the oil-passing hole is defined as "a" and a length of the parallel straight portion is defined as "b", and b/a=0.2 to 0.9.

3. The oil ring for an internal combustion engine according to claim 2, wherein, in the inclined portion which connects the arc portion and the parallel straight portion with each other, a point at which the arc portion and the inclined portion intersect with each other is defined as a point P, a point at which the inclined portion and the parallel straight portion intersect with each other is defined as a point Q, a section between the point P and the point Q is defined as a section S, and
   stress generated in the section S of the inclined portion by a load applied from an upper portion of an arc portion, which is opposed to the arc portion adjacent to the inclined portion, is substantially even.

4. The oil ring for an internal combustion engine according to claim 3, wherein the height $h1$ of the main body of the oil ring is 2.5 mm or less.

5. The oil ring for an internal combustion engine according to claim 2, wherein the height $h1$ of the main body of the oil ring is 2.5 mm or less.

6. The oil ring for an internal combustion engine according to claim 1, wherein, in the inclined portion which connects the arc portion and the parallel straight portion with each other, a point at which the arc portion and the inclined portion intersect with each other is defined as a point P, a point at which the inclined portion and the parallel straight portion intersect with each other is defined as a point Q, a section between the point P and the point Q is defined as a section S, and
   stress generated in the section S of the inclined portion by a load applied from an upper portion of an arc portion, which is opposed to the arc portion adjacent to the inclined portion, is substantially even.

7. The oil ring for an internal combustion engine according to claim 6, wherein the height $h1$ of the main body of the oil ring is 2.5 mm or less.

8. The oil ring for an internal combustion engine according to claim 1, wherein the height $h1$ of the main body of the oil ring is 2.5 mm or less.

* * * * *

UNITED STATES PATENT AND TRADEMARK OFFICE
CERTIFICATE OF CORRECTION

PATENT NO. : 7,510,196 B2
APPLICATION NO. : 11/631575
DATED : March 31, 2009
INVENTOR(S) : Keishi Nanno, Kazuhito Seki and Shiro Shibata It is certified that error appears in the above-identified patent and that said Letters Patent is hereby corrected as shown below:

Column 8, line 35, that portion of the specification reading "0 was set to 90°" should read --$\theta$ was set to 90°--.

Column 9, line 43, that portion of the specification reading "oil ring having 0 of 180°" should read --oil ring having $\theta$ of 180°--.

Column 11, line 38, that portion of the claim 1 reading "the arc portion is defined as 0" should read --the arc portion is defined as $\theta$--.

Column 11, line 38, that portion of the claim 1 reading "0 = 90° to 160°" should read --$\theta$ = 90° to 160°--.

Signed and Sealed this

Fourteenth Day of September, 2010

David J. Kappos
*Director of the United States Patent and Trademark Office*